(12) United States Patent
Naumann et al.

(10) Patent No.: US 7,951,246 B2
(45) Date of Patent: May 31, 2011

(54) METHOD FOR MANUFACTURING OPEN POROUS METALLIC FOAM BODY

(75) Inventors: Dirk Naumann, Mississauga (CA); Lloyd Timberg, Burlington (CA); Alexander Böhm, Hähnichen (DE); Gunnar Walther, Dresden (DE)

(73) Assignees: Alantum Corporation, Joongwon-gu, Seongnam, Gyonggi-do (KR); Fraunhofer Gesellschaft zur Förderung der angewandten FORSCHUNG E.V., München (DE)

( * ) Notice: Subject to any disclaimer, the term of this patent is extended or adjusted under 35 U.S.C. 154(b) by 574 days.

(21) Appl. No.: 11/630,407

(22) PCT Filed: Jun. 23, 2005

(86) PCT No.: PCT/EP2005/006822
§ 371 (c)(1),
(2), (4) Date: Dec. 21, 2006

(87) PCT Pub. No.: WO2006/002834
PCT Pub. Date: Jan. 12, 2006

(65) Prior Publication Data
US 2008/0031767 A1 Feb. 7, 2008

(30) Foreign Application Priority Data
Jun. 25, 2004 (DE) .................. 10 2004 032 089

(51) Int. Cl.
*C22F 1/10* (2006.01)
*C22C 19/03* (2006.01)
*C22C 9/06* (2006.01)

(52) U.S. Cl. .................. 148/675; 420/457; 420/485

(58) Field of Classification Search .................. 420/457, 420/485; 148/675
See application file for complete search history.

(56) References Cited

U.S. PATENT DOCUMENTS

| 3,135,648 | A | * | 6/1964 | Hawkins | 428/511 |
| 3,607,787 | A | * | 9/1971 | Jung et al. | 502/331 |
| 3,689,320 | A | * | 9/1972 | Ashcroft et al. | 419/35 |
| 4,064,914 | A | * | 12/1977 | Grant | 138/142 |
| 5,965,298 | A | | 10/1999 | Harada et al. | |
| 6,255,534 | B1 | * | 7/2001 | Demuth et al. | 568/473 |

FOREIGN PATENT DOCUMENTS

| JP | 08-193232 | 7/1996 |
| JP | 08-222226 | 8/1996 |
| JP | 2002-061573 | 2/2002 |

OTHER PUBLICATIONS

Z.M. Wang, H.Y. Zhou, Z.F. Gu and G. Cheng, Journal of Alloys and Compounds: Preparation and electrode properties of new ternary alloys:REMgNi4 (RE = La, Ce, Pr, Nd)), 384 (2004), pp. 279-282.*

* cited by examiner

*Primary Examiner* — Roy King
*Assistant Examiner* — Jessee R. Roe
(74) *Attorney, Agent, or Firm* — Lexyoume IP Group, PLLC.

(57) ABSTRACT

The invention relates to open-pored metallic foam bodies as well as a method for manufacturing thereof. These metallic foam bodies are allowed to be advantageously used with ambient environmental conditions causing a high corrosion to many conventional materials, and accordingly reducing the lifetime thereof frequently. According to the set object, the metallic foam bodies should have a low mass simultaneously with a high specific surface, and increased corrosion resistance under chemically aggressive ambient environmental conditions. An open-pored metallic foam body according to the invention is then developed such that it is formed from a nickel-copper alloy having at least 40 percent by weight of nickel and yet a porosity of at least 90%.

4 Claims, No Drawings

METHOD FOR MANUFACTURING OPEN POROUS METALLIC FOAM BODY

The invention relates to open-pored metallic foam bodies as well as a method for manufacturing thereof. The open-pored metallic foam bodies according to the invention can be advantageously used at ambient environmental conditions which cause high corrosion to a plurality of conventional materials such that a reduced lifetime of appropriate components has notched up.

Thus, under such field conditions it is known that nickel-copper alloys may achieve an increased corrosion resistance, and thus whole components are manufactured from such alloys.

However, demands are frequently made wherein such components shall have a low mass, and nevertheless a very high specific surface as well as a great volume.

This is desired for heat exchangers, for example, which are to be fitted into chemical plants, for sea-water desalination plants, for different filters and catalytic applications as well.

Therefore, it is an object of the invention to provide components which have a low mass with simultaneously a high specific surface, and an increased corrosion resistance at chemically aggressive ambient environmental conditions.

According to the invention, this object is solved with an open-pored metallic foam body as being defined in claim 1. Such metallic foam bodies can be manufactured with a method according to claim 5.

Preferred embodiments and improvements of the invention can be achieved with the features mentioned in the subordinate claims.

The open-pored metallic foam bodies according to the invention are formed from a nickel-copper alloy in which at least 40 percent by weight, preferably at least 60 percent by weight of nickel are included, and they have a porosity of at least 90%.

In addition to nickel and copper at the most 6 percent by weight of further alloy elements as well as impurities can be included. Appropriate alloy elements are manganese, iron, carbon, silicon, aluminium and titanium, for example.

Due to their relatively high porosity with a low mass and a very large specific surface the open-pored metallic foam bodies according to the invention can be used for a plurality of applications wherein they have good mechanical properties and a sufficient strength at increased temperatures up to above of 500° C. as well.

They are resistant to acids, salts and saline solutions such that they can also be used under such conditions with a high lifetime. In addition to the aggressive substances already mentioned it is to emphasize their resistance to the fluorine and hydrogen fluoride compounds as well as even to hydrofluoric acid.

In the manufacture, semi-finished products are used in the form of open-pored metallic foam bodies made of pure nickel which are commercially available with the minimum porosity being discussed of 90% and beyond.

On that occasion, surfaces of the nickel foam structure of such open-pored metallic foam bodies are coated with a pure copper and/or a copper oxide powder.

Coating shall be then carried out such that the surface of the nickel foam structure has been coated within the open pores as well but also within the webs.

Subsequent to coating with the powder or powder mixture a thermal treatment at temperatures of above of 700° C. takes place which results in an alloying effect of nickel and copper.

The composition of the alloy obtained in the end can be influenced in relatively wide limits by means of the powder quantity employed.

As a result of the extra application of an organic binding agent, coating with the powder can be influenced such that uniformly adhering of powder particles on the surface is obtainable.

It is advantageous for such an organic binding agent to be used in a more or less liquid form, preferred in an aqueous solution such that it is also allowed to form a suspension/dispersion with the basic powder used a time.

Coating the surfaces of nickel foam structure of the nickel foam body can be achieved relatively simply by immersing the metallic foam body in the pure binding agent free of powder, and a suspension/ dispersion, respectively. Subsequent to immersing a more uniform distribution and removing of the excessive binding agent as the case may be, and also of the suspension/dispersion including respective powders, respectively, can be achieved by means of pressing action which is preferably carried out upon an absorbent pad.

After immersing and pressing, the metallic foam body thus prepared can be set vibrating by means of a vibration means in order to still improve making the coating uniform. In this case, the powder can be then deposited. The powder is distributing over the moved surfaces wetted with the binding agent, and is then adhering to the surfaces.

A metallic foam body thus prepared is still an open-pored one.

It is subjected to a thermal treatment, preferably in an inert gas atmosphere, especially preferred in a hydrogen atmosphere.

At the same time, in a first stage from appr. 300° C. up to the range of 600° C. expelling of organic constituents, so called disengaging takes place.

With further temperature increase starting from 700° C. alloying of the metals nickel and copper can be then achieved wherein said copper which, as the case may be, has also been reduced from the copper oxide under the circumstances being mentioned, is allowed to diffuse into the nickel with no problem, and alloying can be achieved in this way.

As a result, the strength of the finished metallic foam body is still increased compared with the metallic foam body formed from pure nickel.

With initial conditions otherwise being the same in particular concerning the used powder and the used metallic foam body made of pure nickel, a calculated influence on the respective porosity and respective specific surface of a finished open-pored metallic foam body according to the invention can be achieved as a result of the specific variation and influencing control during the thermal treatment as for the respective temperatures, in particular.

Thus, for example, during the thermal treatment with temperatures in the range of between 700° C. and 900° C. a relatively insignificant decrease of the porosity compared with the porosity of the metallic foam body made of pure nickel, with a simultaneous increase of the specific surface of the open-pored metallic foam body can be achieved subsequent to the thermal treatment.

Unlike, during a thermal treatment at higher temperatures which preferably are in the temperature range of between 1100° C. and 1300° C., the initial porosity of the nickel foam structure is maintained at least approximately, and because of a very smooth surface of the webs and inner walls of the pores which can be achieved with it, the specific surface still remains nearly constant compared with the metallic foam body made of pure nickel originally used.

If a catalytically acting metallic foam body according to the invention is to be manufactured, on the one hand, adding a catalytically acting substance in powder form which will not become a constituent of the alloy during thermal treatment to be subsequently implemented, to the initial powder which is to employ for coating the nickel foam structure, is possible. A second possibility is in that, subsequent to the thermal treatment, depositing the metallic foam body formed from the nickel-copper alloy in an analogous form as a layer upon the surfaces thereof as that has been previously described, and subsequently carrying out a specific thermal treatment which is specific for the respective catalytically acting substance such that it will be more or less sintered upon.

In particular for metallic catalytically acting substances, however, electroplating on the otherwise finished metallic foam body according to the invention subsequent to the thermal treatment is a possible way.

In the following, the invention shall be explained in more detail according to embodiments.

EMBODIMENT 1

As an initial powder it will be used 20 g of powder having a mean particle size of 20 μm and a spattered form.

An open-pored metallic foam body made of pure nickel which has shown a porosity of appr. 94% and dimensions of 300 mm*150 mm*1.7 mm is immersed into 50 milliliters of 1% aqueous solution of polyvinylpyrrolidone as an organic binding agent.

Subsequent to immersing, the metallic foam body made of pure nickel thus prepared was pressed with the binding agent upon an absorbent pad in order to remove excessive binding agent from the pore spaces such that merely the inner surface with the webs of the nickel foam structure has remained wetted.

Subsequent to this, the nickel foam structure thus coated has been fixed in a vibration apparatus and set vibrating. During oscillating, the copper powder was scattered from both sides upon the metallic foam body wetted with the binding agent to obtain a uniform distribution of powder in the porous network of the nickel foam structure, and to maintain the open porosity.

The nickel foam structure thus prepared and coated with the binding agent and copper powder on the surface is allowed to be deformed if this is desired. Thus, it is allowed to be wound in the form of a hollow cylinder, for example. During the deformation the copper particles adhere on the surface.

The nickel foam structure thus coated and deformed, as the case may be, is then subjected to a thermal treatment which is to carry out in a hydrogen atmosphere. At the same time, it is operated with a heating-up period of 5 K/min. In the temperature range of between 300° C. and 600° C. the organic constituents are expelled wherein preferably a holding time of appr. 30 minutes should be held for this.

Subsequently, the temperature is then increased with the same heating-up period into the range of between 1100° C. to 1300° C., and is maintained over a time interval of 30 minutes.

Subsequent to the thermal treatment, the open-pored metallic foam body thus manufactured has shown again a porosity of appr. 94% which corresponds to the initial porosity of the metallic foam body made of pure nickel.

The webs and inner walls of the metallic foam body were smooth.

The open-pored metallic foam body thus manufactured has shown the desired high corrosion resistance and has achieved a considerably increased strength compared with the nickel foam structure, and subsequently it could still well be further machined.

The sintered porous structure is made up of a single-phase solid solution copper-nickel alloy with a nickel content of at least 40%. In the alloy, Mn, Fe, C, Si, Al, Ti, S may be further included.

EMBODIMENT 2

In this connection, it was used an identical open-pored metallic foam body made of pure nickel, the same initial copper powder as well as such a 1% aqueous solution of polyvinylpyrrolidone.

Also, the first stage of the thermal treatment which shall result in disengaging has been carried out in an identical form. Merely the second stage of the thermal treatment has been carried out at significantly reduced temperatures, namely in the range of between 700° C. and 900° C. which has been then maintained over a time interval of 1 hour.

After this thermal treatment, the metallic foam body made of the nickel-copper alloy and manufactured this way has shown a slightly reduced porosity of appr. 91% compared with the initial porosity of the open-pored metallic foam body made of pure nickel of appr. 94%. However, the inner surface and the webs as well have shown an increased roughness which has been caused by some incomplete sintering of copper particles such that a distinct increase of the specific surface of the open-pored metallic foam body finished was to be noted.

Actually, the desired advantageous properties already mentioned could be achieved.

The invention claimed is:

1. A method for manufacturing open-pored metallic foam bodies characterized in that a nickel foam structure is made of pure nickel and is coated with a copper powder or copper oxide powder thereby forming the open-pored metallic foam bodies such that said powder is covering the surface of said nickel foam structure also within open pores, and subsequently a thermal treatment is carried out at temperatures from approximately 300° C. up to 600° C. and then is increased to 700° C. and above, wherein alloying of at least said nickel and said copper takes place, and
   wherein said thermal treatment is carried out in a hydrogen atmosphere.

2. A method for manufacturing open-pored metallic foam bodies characterized in that a nickel foam structure is made of pure nickel and is coated with a copper powder or copper oxide powder thereby forming the open-pored metallic foam bodies such that said powder is covering the surface of said nickel foam structure also within open pores, and subsequently a thermal treatment is carried out at temperatures from approximately 300° C. up to 600° C. and then is increased to 700° C. and above, wherein alloying of at least said nickel and said copper takes place, and
   wherein during said thermal treatment in the temperature range of 1100° C. to 1300° C. the initial porosity of said nickel foam structure is maintained.

3. A method for manufacturing open-pored metallic foam bodies characterized in that a nickel foam structure is made of pure nickel and is coated with a copper powder or copper oxide powder thereby forming the open-pored metallic foam bodies such that said powder is covering the surface of said nickel foam structure also within open pores, and subsequently a thermal treatment is carried out at temperatures from approximately 300° C. up to 600° C. and then is increased to 700° C. and above, wherein alloying of at least said nickel and said copper takes place, and wherein a catalytically acting substance in powder form is added to said powder prior to said thermal treatment.

4. A method for manufacturing open-pored metallic foam bodies characterized in that a nickel foam structure is made of pure nickel and is coated with a copper powder or copper oxide powder thereby forming the open-pored metallic foam bodies such that said powder is covering the surface of said nickel foam structure also within open pores, and subsequently a thermal treatment is carried out at temperatures from approximately 300° C. up to 600° C. and then is increased to 700° C. and above, wherein alloying of at least said nickel and said copper takes place, and wherein subsequent to said thermal treatment a catalytically acting substance is deposited galvanically or by sintering upon said surface.

* * * * *